(12) United States Patent
Inoguchi et al.

(10) Patent No.: US 7,107,058 B2
(45) Date of Patent: Sep. 12, 2006

(54) PRINTING DEVICE, DIAGNOSING METHOD FOR PRINTING DEVICE, AND DIAGNOSING PROGRAM FOR PRINTING DEVICE

(75) Inventors: Makoto Inoguchi, Nishitokyo (JP); Osamu Honda, Fuchu (JP); Isuke Karaki, Yokohama (JP); Masahiro Kitano, Yokohama (JP)

(73) Assignee: Seiko Epson Corporation, (JP)

( * ) Notice: Subject to any disclaimer, the term of this patent is extended or adjusted under 35 U.S.C. 154(b) by 898 days.

(21) Appl. No.: 10/240,571

(22) PCT Filed: Mar. 28, 2002

(86) PCT No.: PCT/JP02/03099

§ 371 (c)(1),
(2), (4) Date: Oct. 3, 2002

(87) PCT Pub. No.: WO02/080413

PCT Pub. Date: Oct. 10, 2002

(65) Prior Publication Data

US 2003/0148766 A1    Aug. 7, 2003

(30) Foreign Application Priority Data

Mar. 28, 2001  (JP) ............................. 2001-094090

(51) Int. Cl.
*H04B 7/20* (2006.01)
*H04B 7/00* (2006.01)

(52) U.S. Cl. ...................... 455/450; 455/513; 358/1.15

(58) Field of Classification Search ................ 455/450, 455/513, 1.15, 464, 509, 456.1; 370/329
See application file for complete search history.

(56) References Cited

U.S. PATENT DOCUMENTS 5,524,185 A * 6/1996 Na ............................. 358/1.15
5,696,894 A * 12/1997 Ono ........................... 358/1.15

(Continued)

FOREIGN PATENT DOCUMENTS

JP      A 1-298825      12/1989

(Continued)

OTHER PUBLICATIONS

Communication from European Patent Office re: counterpart application.

*Primary Examiner*—Kimberly Williams
*Assistant Examiner*—Scott Schlack
(74) *Attorney, Agent, or Firm*—Harness, Dickey & Pierce, P.L.C.

(57) ABSTRACT

A printer that enables a determination whether a failure has occurred in a device during initialization or a radio wave condition is bad. Receive electric field strength during a time period from a time at which a turn-off message is outputted to a time at which turn-on message is outputted and receive electric field strength after the turn-on message is outputted are measured. The measurements are compared with each other and information indicating the condition of each of a plurality of channels is printed out according to the results of the comparison. A user can reference the printed information to determine whether a failure has occurred in a device or the radio wave condition is bad.

12 Claims, 4 Drawing Sheets

U.S. PATENT DOCUMENTS

| | | | |
|---|---|---|---|
| 5,788,656 A * | 8/1998 | Mino | 601/47 |
| 5,933,420 A * | 8/1999 | Jaszewski et al. | 370/329 |
| 6,016,430 A * | 1/2000 | Shinomiya | 455/515 |
| 6,185,379 B1 | 2/2001 | Lay et al. | |
| 6,665,314 B1 * | 12/2003 | Liebenow | 370/477 |
| 6,690,940 B1 * | 2/2004 | Brown et al. | 455/456.4 |
| 6,694,143 B1 * | 2/2004 | Beamish et al. | 455/456.1 |
| 6,801,974 B1 * | 10/2004 | Watts et al. | 710/303 |

FOREIGN PATENT DOCUMENTS

| | | | |
|---|---|---|---|
| JP | A 4-149713 | 5/1992 | |
| JP | A 4-239829 | 8/1992 | |
| JP | 04313926 | 11/1992 | |
| JP | A 4-313926 | 11/1992 | |
| JP | U 5-39047 | 5/1993 | |
| JP | A 5-284100 | 10/1993 | |
| JP | 05212318 A * | 2/1995 | |
| JP | 07050630 | 2/1995 | |
| JP | A 7-50630 | 2/1995 | |

* cited by examiner

PRINTING DEVICE, DIAGNOSING METHOD FOR PRINTING DEVICE, AND DIAGNOSING PROGRAM FOR PRINTING DEVICE

TECHNICAL FIELD

The present invention relates to a printer, a printer diagnostic method, and printer diagnostic program, and in particular to a printer that uses one of a plurality of channels to perform wireless communication, a diagnostic method and a diagnostic program for the printer.

BACKGROUND ART

When a data is communicated wirelessly, the communication must typically be performed with a high receive electric field strength in order to prevent errors in the data. The same holds true for wireless data communication between a computer and a printer.

In Japanese Patent Laid-Open publication No. 7-50630, a technology is described in which a plurality of antennas are provided, the receive electric field strengths of the antennas are measured, and the antenna that provides the highest receive electric field strength measurement is used to perform wireless data communication between a computer and a printer.

According to the prior art described in that publication, if a connection error occurs after communication is established, the error state is reported or printed out by another communication means.

However, if there is radio interference or a radio wave from a device with which communication is to be performed is weak, an average user cannot readily know that radio wave condition during initialization (after a printer is purchased or a network is created, for example). Consequently, the user cannot determine whether a failure has occurred in the device or the condition of the radio wave is bad.

For example, when wireless data communication is performed between a computer and a printer by using a wireless LAN conforming to the well-known Bluetooth® or IEEE 802.11b standard, the 2.4 GHz band is used, which overlaps bands used by other devices such as a microwave oven and mobile device identification. Therefore, there is a problem that an average user cannot readily know the radio wave condition and therefore cannot determine whether a failure has occurred in the device or the conditions of the radio wave are bad.

The present invention has been achieved in order to solve the problem with the prior art and an object of the present invention is to provide a printer, a printer diagnostic method, and a printer diagnostic program that enable the determination whether a failure has occurred in a device or a radio wave condition is bad during initialization of the printer.

DISCLOSURE OF THE INVENTION

According to a printer as set forth in claim 1 of the present invention, there is provided a printer that uses one of a plurality of channels to perform wireless communication, comprising: turn-off message output means for outputting a turn-off message suggesting an operation for turning off a device emitting radio interference; turn-on message output means for outputting a turn-on message suggesting an operation for turning on the device emitting the ratio interference; and channel condition output means for outputting information indicating the condition of each of the plurality of channels according to the result of comparison between receive electric field strength during the time period from a time at which the turn-off message is outputted to a time at which the turn-on message is outputted and receive electric field strength after the turn-on message is outputted.

According to a printer as set forth in claim 2 of the present invention, the printer according to claim 1 further comprises means for outputting a message suggesting changing the installation location of the printer if the receive electric field strengths of all the plurality of channels are lower than a predetermined threshold.

According to a printer as set forth in claim 3 of the present invention, in the printer according to claim 1, the channel condition output means prints out information indicating the condition of each of the plurality of channels.

According to a printer as set forth in claim 4 of the present invention, the printer according to claim 3 further comprises means for outputting a message suggesting changing the installation location of the printer if the receive electric field strengths of all the plurality of channels are lower than a predetermined threshold.

According to a printer diagnostic method as set forth in claim 5 of the present invention, there is provided a printer diagnostic method for diagnosing a printer that uses one of a plurality of channels to perform wireless communication, comprising the steps of: outputting a turn-off message suggesting an operation for turning off a device emitting radio interference; outputting a turn-on message suggesting an operation for turning on the device emitting the radio interference; and outputting information indicating the condition of each of the plurality of channels according to the result of comparison between receive electric field strength during the time period from a time at which the turn-off message is outputted to a time at which the turn-on message is outputted and receive electric field strength after the turn-on message is outputted.

According to a printer diagnostic method as set forth in claim 6 of the present invention, the printer diagnostic method according to claim 5 further comprises the step of outputting a message suggesting changing the installation location of the printer if the receive electric field strengths of all the plurality of channels are lower than a predetermined threshold.

According to a printer diagnostic method as set forth in claim 7 of the present invention, in the printer diagnostic method according to claim 5, the step of outputting channel condition comprises the step of printing out information indicating the condition of each of the plurality of channels.

According to a printer diagnostic method as set forth in claim 8 of the present invention, the printer diagnostic method according to claim 7 further comprises the step of outputting a message suggesting changing the installation location of the printer if the receive electric field strengths of all said plurality of channels are lower than a predetermined threshold.

According to a printer diagnostic program as set forth in claim 9 of the present invention, there is provided a printer diagnostic program for diagnosing a printer that uses one of a plurality of channels to perform wireless communication, comprising the steps of: outputting a turn-off message suggesting an operation for turning off a device emitting radio interference; outputting a turn-on message suggesting an operation for turning on the device emitting the radio interference; and outputting information indicating the condition of each of the plurality of channels according to the result of comparison between receive electric field strength during the time period from a time at which the turn-off message is outputted to a time at which the turn-on message is outputted and receive electric field strength after the turn-on message is outputted.

According to a printer diagnostic program as set forth in claim 10 of the present invention, the printer diagnostic program according to claim 9 further comprises the step of outputting a message suggesting changing the installation location of the printer if the receive electric field strengths of all the plurality of channels are lower than a predetermined threshold.

According to a printer diagnostic program as set forth in claim 11 of the present invention, in the printer diagnostic program according to claim 9, the step of outputting channel condition comprises the step of printing out information indicating the condition of each of the plurality of channels.

According to a printer diagnostic program as set forth in claim 12 of the present invention, the printer diagnostic program according to claim 11 further comprises the step of outputting a message suggesting changing the installation location of the printer if the receive electric field strengths of all the plurality of channels are lower than a predetermined threshold.

BEST MODE FOR CARRYING OUT THE INVENTION

Next, an embodiment of the present invention will be described below with reference to the accompanying drawings. Like parts are labeled with like reference numerals in the drawings referred to in the following description.

Figure 1:
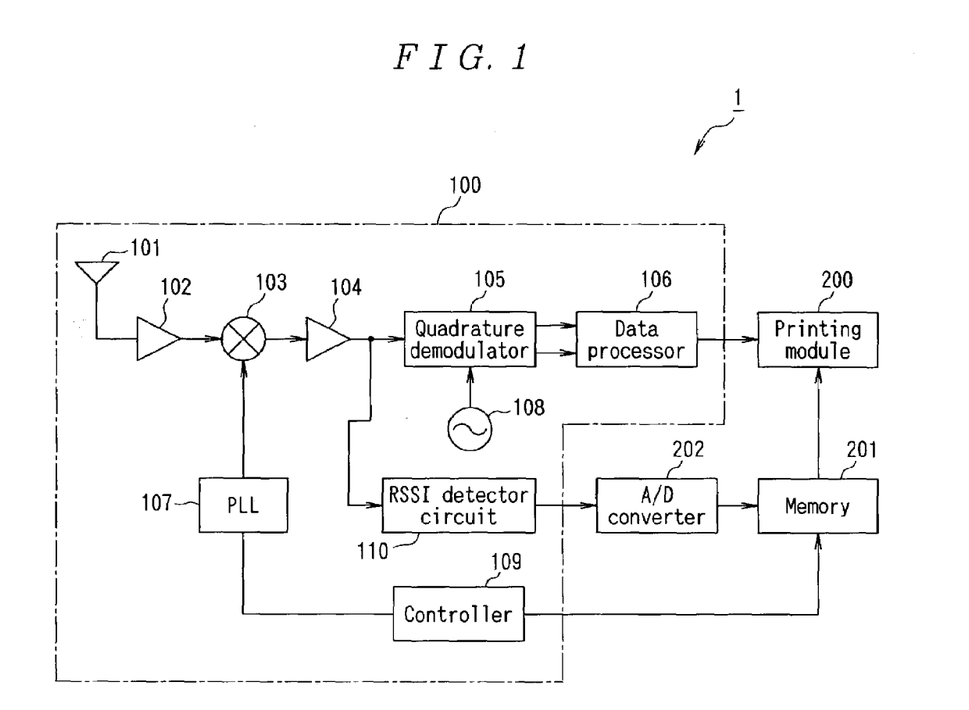
FIG. 1 shows a block diagram of an embodiment of a printer according to the present invention.

FIG. 1 shows a block diagram of an embodiment of a printer according to the present invention. As shown in FIG. 1, a printer 1 according to this embodiment comprises a receiving module 100 for wirelessly receiving data from a higher level device such as a computer which is not shown or the like, a printing module 200 for printing the data received by the receiving module 100, an A/D converter 202 for converting an RSSI (Received Signal Strength Indicator) signal outputted from the receiving module 100 into digital data, and memory 201 for storing the digital data converted by the A/D converter 202.

The receiving module 100 has a configuration similar to the receiving modules of typical radio devices. The receiving module 100 comprises an antenna 101, an RF amplifier 102, a mixer 103, an AGC (Automatic Gain Control) amplifier 104, a quadrature demodulator 105 for performing quadrature demodulation, a data processor 106 for performing processes such as conversion from a demodulated output of this quadrature demodulator 105 to printable data, a PLL (Phase Locked Loop) 107, a secondary local oscillator 108 for generating an oscillated signal to be provided to the quadrature demodulator 105, a controller 109 for controlling output frequencies of the PLL 107 and reads/writes to and from the memory 201, and an RSSI detector circuit 110. The RSSI detector circuit 110 converts an increase and decrease in the input level of an received signal into a DC voltage. Receivers that use a quadrature demodulator 105 perform an AGC operation and therefore include typically an RSSI detector circuit 110. The RSSI detector circuit 110 is also called a carrier sense circuit and defined in typical wireless LAN specifications.

In the printer thus configured, a signal received by the antenna 101 is amplified by the RF amplifier 102 and the amplified signal is multiplied by an output from the PLL 107 in the mixer 103. The multiplied output is amplified with a predetermined gain by the AGC amplifier 104 and demodulated by the quadrature demodulator 105. The demodulated output is converted into printable data by the data processor 106. The converted data is sent to the printing module 200, where it is printed out. Through the process as described above, the printer 1 can print out data received from a device such as a computer, which is not shown.

In the printer 1 shown in FIG. 1, when the printer is initially turned on or when the test mode for measuring the level of radio interference can be selected by a user depresses a function key, the printer 1 is placed in radio wave search mode. In the radio wave search mode, the components will operate as follows.

First, channel data is sent from the controller 109 to the PLL 107 and memory 201. This PLL 107 changes receive frequencies (CH) at regular intervals. In other words, different channels use different carrier frequencies in this printer.

The RSSI detector circuit 110 converts an increase and decrease in the input level of the receiver into a DC voltage. This RSSI signal converted by the RSSI detector circuit 110 is inputted into the A/D converter 202, where it is converted into a digital signal. The digital signal outputted from the A/D converter 202 is written into the memory 201 as channel data (CH DATA). The channel data written in the memory 201 is read by the controller 109 and sent to the printing module 200, where data indicating radio wave conditions is printed out.

In order to record RSSI signals of all of the first through Nth channels, this printer will operate as follows. When the printer 1 is powered on or enters test mode, the receiving module operates and records the RSSI signal of the first channel. It then changes over to the second channel and records the RSSI signal of the second channel, then the RSSI signal of the third channel, and so on. After the RSSI signal of the Nth channel is recorded, these pieces of data are combined and printed out.

A user can reference the print-out data to select a channel that is not affected by radio interference during initialization. That is, the printer prints out the results of the examination of radio wave conditions before wireless communication is established, therefore the user can set the channel least susceptible to radio interference as the channel to be used.

Figure 2:
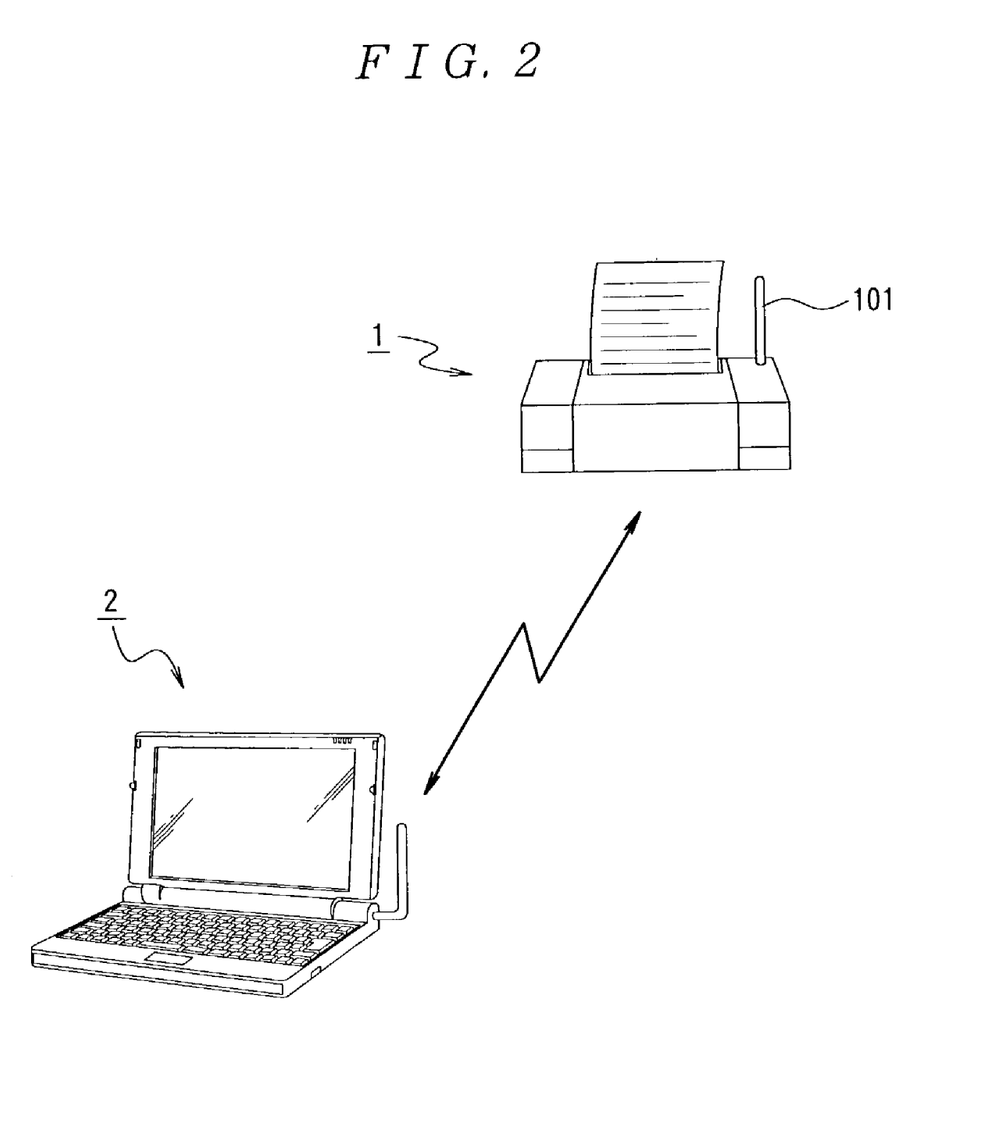
FIG. 2 shows data communication state between the printer and a higher level device according to the present invention.

The printer 1 configured above communicates data with a higher level device 2 wirelessly as shown in FIG. 2. This higher level device 2 is a device, such as a computer, that sends data to be printed. And, in the printer 1, the printing module 200 prints the data, which is received by the receiving module 100 as described above.

The capability of monitoring radio waves as described above may be also provided in the higher level device, such as a computer, that provides data to be printed, in which case it can be determined which of the printer or the computer is interfered, and the interference can be resolved even if communication cannot been made between them.

Furthermore, communication quality (error rates) and other information may be printed out after the communication is established.

Figure 3:
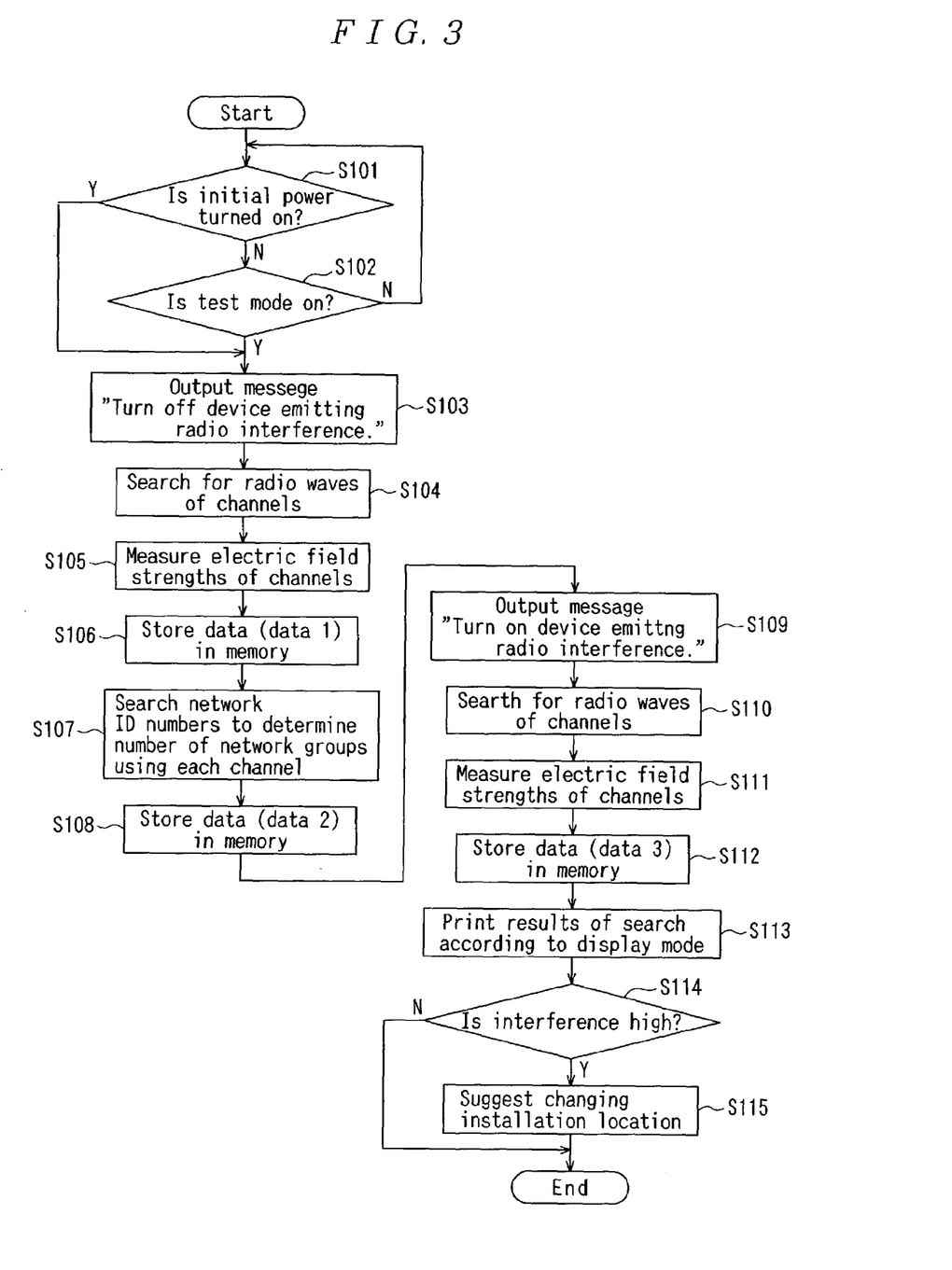
FIG. 3 shows a flowchart of a printer diagnostic process according to the present invention.

An operation for identifying a device emitting radio wave signals which can possibly cause interference will be described below with reference to FIG. 3. FIG. 3 shows a flowchart of a process for identifying a device causing radio interference in the printer. In FIG. 3, it is determined first whether the printer is turned on in an initial state of the printer (step S101). Then, it is determined whether the printer is placed in test mode (step S102). If one of the conditions in steps S101 and S102 holds, then the process proceeds to step S103.

A message is outputted that states "Turn off a device emitting radio interference." (step S103). The message at step S103 may be presented on a display panel of a display such as a liquid crystal display or may be provided as an audio output. If paper has already been set in the printer, the message may be printed out.

After the message is outputted, channels used for wireless communication are searched for radio waves (step S104) and the receive electric field strength of each channel is measured (step S105). The radio wave search and electric field strength measurement may be automatically started after the expiration of a predetermined time interval after the above-described message is outputted or may be started in response to an instruction from a user depressing a button.

Then, the data measured at step S105 is stored in the memory (step S106). The data is referred to as "data 1" herein. Network identification numbers are searched through to determine the number of network groups that are using each channel (step S107). Data measured at step S107 is stored in the memory (step S108). The data is referred to as "data 2."

Thereby, the turn-off message has been outputted for suggesting an operation for turning off a device emitting radio interference and the receive electric field strengths after the output of the message have been measured.

Then, a message is outputted that states "Turn on the device emitting the radio interference." (step S109). The message at step S109 may be presented on a display panel of a display such as a liquid crystal display or may be provided as an audio output. If paper has already been set in the printer, the message may be printed out.

After this message is outputted, the channels used for wireless communication are searched for radio waves (step S110) and the receive electric field strengths of the channels are measured (step S111). The radio wave search and electric field strength measurement may be automatically started after the expiration of a predetermined time interval after the output of the message or may be started in response to an instruction from the user depressing a button.

Then, the data measured at step S111 is stored in the memory (step S112). The data is referred to as data 3 herein.

Thereby, the turn-on message has been outputted for suggesting an operation for turning on the device emitting radio interference and the receive electric field strengths after the output of the message have been measured.

Then, the results of the search are printed and outputted according to display mode (step S113). Data 1 is compared with data 2 to present information about the frequencies (CH) of devices emitting radio interferences. Thus, the receive electric field strength during the time period from the output of the turn-off message to the output of the turn-on message and the receive electric field strength after the output of the turn-on message are measured and compared with each other. Based on the results of the comparison, information indicating the condition of each of the plurality of channels will be displayed.

It is possible that the interferences are so high that none of the channels can be used. If all of the plurality of channels provide high interferences because the receive electric field strengths of them are lower than a predetermined threshold, a message is outputted for suggesting that the installation location of the printer should be changed (steps S114 through S115) to allow a user to change the installation location. Depending on the installation location of the printer, receive electric field strength can be significantly improved.

The message at this step S115 may be presented on a display panel of a display such as a liquid crystal display or may be presented as an audio output. If paper has already been set in the printer, the message may be printed out. Whether interference is high or not can be determined based on.

If it is determined at step S114 that the radio interference is low, then the process will end.

The data printed out at step S113 described above may be numeric values or spectrum presentation with pictorial symbols. Spectrum presentation has the advantage that radio wave conditions can be visually seen and is therefore suitable for average users.

Figure 4:
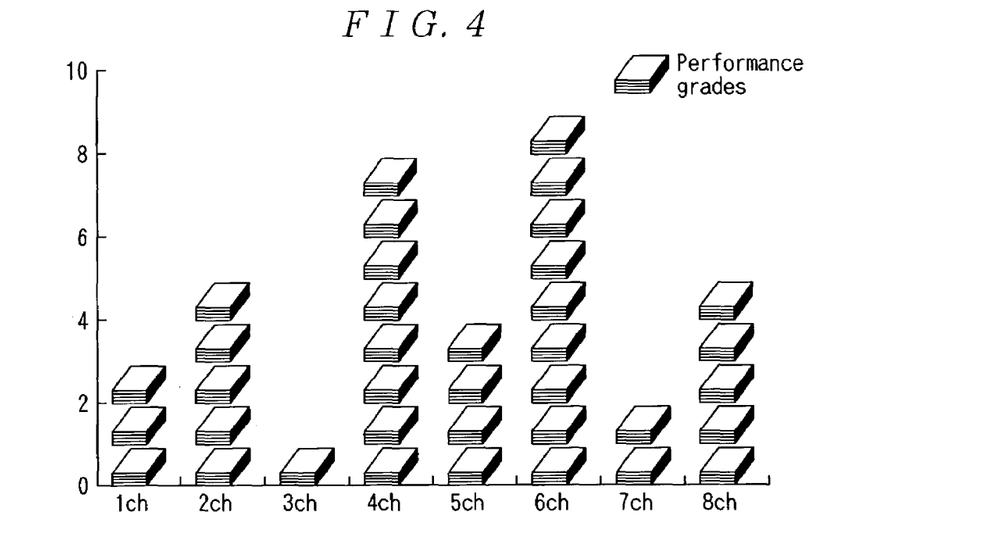
FIG. 4 shows an exemplary display of results of printer diagnosis.

It is desirable for the average users that interference strengths obtained from comparison between data 1 and data 2 and the number of networks that use the channels (data 3) are used to compute the expected numbers of sheets the printer can print out per time through the channels. These values are displayed as performance grades of the channels. FIG. 4 shows an example of this display. In FIG. 4, the number of sheets per unit time that can be printed out through the first channel 1ch through the eighth channel 8ch are presented in a visual form with pictorial symbols. In this example shown in FIG. 4, the sixth channel 6ch is expected to provide the highest performance. It should be noted that the number of channels is not limited to eight.

Figure 5:
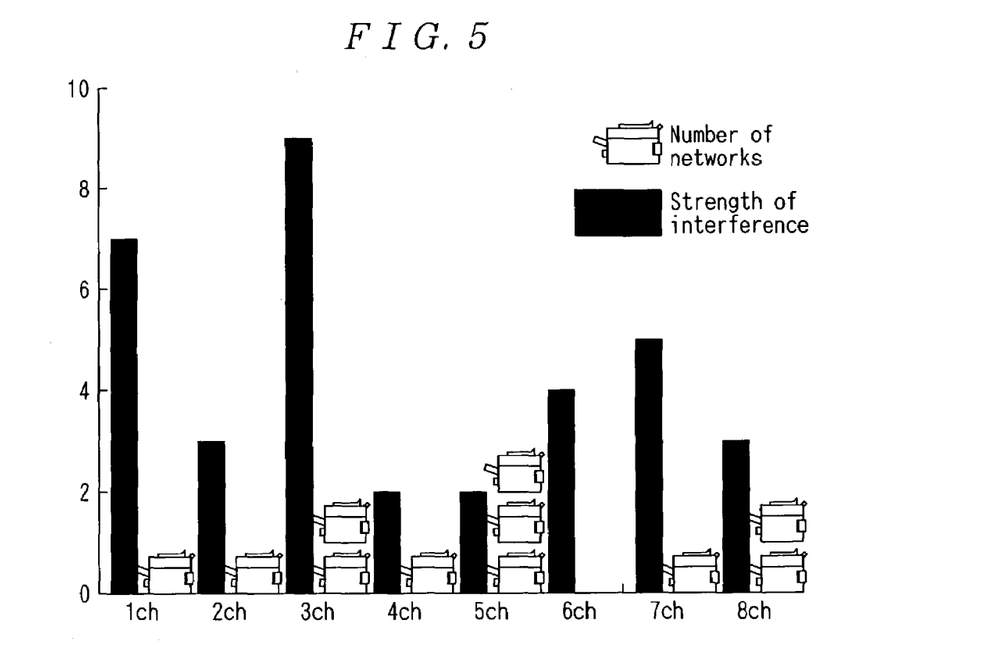
FIG. 5 shows another exemplary display of the results of printer diagnosis.

On the other hand, for a user, such as a network system administrator, who is familiar with wireless communication systems, interference strengths obtained from data 1 and data 2 and the number of networks (data 3) are directly displayed at step S113. FIG. 5 shows an example of this display. In the example shown in FIG. 5, it can be seen that the third channel 3ch among the first channel 1ch through the eighth channel 8ch exhibits the highest interference strength and the fifth channel 5ch is used by the largest number of devices. It should be noted that the number of channels is not limited to eight.

The printed sheet may contain the number and name of a contact office (the telephone number of a service center or the like) to call in case failure occurs. It may also indicate channels that can be set (interference-free channels).

While the embodiment has been described with respect to a printer, the capability of implementing the process shown in FIG. 3 may be provided in a projector including a wireless LAN facility to allow the user to reference measurements to select an optimum channel. In that case, information about a problem may be projected onto a screen, instead of printing out it. The present invention is not limited to a printer. The present invention can be applied to any data output devices that wirelessly receive data to output.

A printer diagnostic method described below is implemented in the printer described above. That is, it is a method of diagnosing a printer that uses one of a plurality of channels to perform wireless communication, comprising the steps of: outputting a turn-off message suggesting that a device emitting radio interference should be turned off; outputting a turn-on message suggesting that the device emitting the radio interference should be turned on; and outputting information indicating the condition of each of the plurality of channels according to the result of comparison between a receive electric field strength during the time period from the output of the turn-off message to the output of the turn-on message and a receive electric field strength during the time period after the output of the turn-on message. In the step of outputting information about the channel condition, information indicating the conditions of each of the plurality of channels is printed out. The method may further comprise the step of outputting a message suggesting that the installation location of the printer should be changed if the receive electric field strengths of all of the plurality of channels are lower than a predetermined threshold.

It is apparent that a program for implementing the process shown in FIG. 3 or the like can be provided to control a computer to perform radio wave condition measurement as described above. A recording medium for recording this program may be any of various recording media, including semiconductor memory, magnetic disk, and optical disk which are not shown in FIG. 1 or the like.

The preceding description relates to a specific embodiment of the present invention. Variations of the present invention may occur to those skilled in the art, all of which are included in the technical scope of the present invention.

INDUSTRIAL APPLICABILITY

The above described present invention has the following advantages. That is, receive electric field strength during the time period from the output of a turn-off message to the output of a turn-on message and receive electric field strength after the output of the turn-on message are measured and compared with each other to output information indicating the conditions of a plurality of channels based on the results of the comparison, as described above. There by, a user can reference the information to determine whether a failure has occurred in a device or the condition of a radio wave is bad.

According to the present invention, information about radio wave conditions is printed out during initialization of a printer that has a wireless LAN (Local Area Network) facility or is connected to a wireless printer server. The capability of measuring the radio interference level of each of channels, which is added to the wireless communication facility in the printer, allows a program for searching for radio wave conditions to be activated when the printer is initially turned on or test mode for measuring the level of radio interference is activated, thereby printing the radio wave conditions. Without having to connect the printer to a computer, the user can be provided with information about which channel should be selected.

The invention claimed is:

1. A printer that uses one of a plurality of channels to perform wireless communication, characterized by comprising:
   turn-off message output means for outputting a turn-off message suggesting an operation for turning off a device emitting radio interference;
   turn-on message output means for outputting a turn-on message suggesting an operation for turning on said device emitting the radio interference; and
   channel condition output means for outputting information indicating the condition of each of said plurality of channels according to the result of comparison between receive electric field strength during the time period from a time at which said turn-off message is outputted to a time at which said turn-on message is outputted and receive electric field strength after said turn-on message is outputted.

2. The printer according to claim 1, characterized by further comprising means for outputting a message suggesting changing an installation location of the printer if the receive electric field strengths of all said plurality of channels are lower than a predetermined threshold.

3. The printer according to claim 1, characterized in that said channel condition output means prints out information indicating the condition of each of said plurality of channels.

4. The printer according to claim 3, characterized by further comprising means for outputting a message suggesting changing the installation location of the printer if the receive electric field strengths of all said plurality of channels are lower than a predetermined threshold.

5. A printer diagnostic method of diagnosing a printer that uses one of a plurality of channels to perform wireless communication, characterized by that comprising the steps of:
   outputting a turn-off message suggesting an operation for turning off a device emitting radio interference;
   outputting a turn-on message suggesting an operation for turning on said device emitting the radio interference; and
   outputting information indicating the condition of each of said plurality of channels according to the result of comparison between receive electric field strength during the time period from a time at which said turn-off message is outputted to a time at which said turn-on message is outputted and receive electric field strength after said turn-on message is outputted.

6. The printer diagnostic method according to claim 5, characterized by further comprising the step of outputting a message suggesting changing the installation location of the printer if the receive electric field strengths of all said plurality of channels are lower than a predetermined threshold.

7. The printer diagnostic method according to claim 5, characterized in that said step of outputting channel condition comprises the step of printing out information indicating the condition of each of said plurality of channels.

8. The printer diagnostic method according to claim 7, characterized by further comprising the step of outputting a message suggesting changing the installation location of the printer if the receive electric field strengths of all said plurality of channels are lower than a predetermined threshold.

9. A computer-readable medium comprising a printer diagnostic program for diagnosing a printer that uses one of a plurality of channels to perform wireless communication, characterized by comprising the steps of:
   outputting a turn-off message suggesting an operation for turning off a device emitting radio interference;
   outputting a turn-on message suggesting an operation for turning on said device emitting the radio interference; and
   outputting information indicating the condition of each of said plurality of channels according to the result of comparison between receive electric field strength during the time period from a time at which said turn-off message is outputted to a time at which said turn-on message is outputted and receive electric field strength after said turn-on message is outputted.

10. The printer diagnostic program according to claim 9, characterized by further comprising the step of outputting a message suggesting changing the installation location of the printer if the receive electric field strengths of all said plurality of channels are lower than a predetermined threshold.

11. The printer diagnostic program according to claim 9, characterized in that said step of outputting channel condition comprises the step of printing out information indicating the condition of each of said plurality of channels.

12. The printer diagnostic program according to claim 11, characterized by further comprising the step of outputting a message suggesting changing the installation location of the printer if the receive electric field strengths of all said plurality of channels are lower than a predetermined threshold.

* * * * *

UNITED STATES PATENT AND TRADEMARK OFFICE
CERTIFICATE OF CORRECTION

PATENT NO. : 7,107,058 B2 Page 1 of 1
APPLICATION NO. : 10/240571
DATED : September 12, 2006
INVENTOR(S) : Makoto Inoguchi et al.

It is certified that error appears in the above-identified patent and that said Letters Patent is hereby corrected as shown below:

Column 1, Line 64: "ratio" should be --radio--

Column 4, Line 2: "an" should be --a--

Column 4, Line 67: "been" should be --be--

Column 5, Line 61: "data 2" should be --data 3--

Column 6, Line 18: After "on" insert --the RSSI signals--

Column 6, Line 28: "data 2" should be --data 3--

Column 6, Line 28: "data 3" should be --data 2--

Column 6, Line 42: "data 2" should be --data 3--

Column 6, Line 42: "data 3" should be --data 2--

Signed and Sealed this

Twenty-sixth Day of February, 2008

JON W. DUDAS
*Director of the United States Patent and Trademark Office*